United States Patent [19]

Willard, Sr.

[11] 3,951,778

[45] Apr. 20, 1976

[54] METHOD OF SEPARATING BITUMIN FROM BITUMINOUS SANDS AND PREPARING ORGANIC ACIDS

[75] Inventor: John W. Willard, Sr., Rapid City, S. Dak.

[73] Assignee: CAW Industries, Inc., Rapid City, S. Dak.

[22] Filed: Mar. 26, 1974

[21] Appl. No.: 455,021

Related U.S. Application Data

[63] Continuation-in-part of Ser. No. 317,097, Dec. 20, 1972, Pat. No. 3,893,943, Continuation of Ser. No. 108,198, Jan. 20, 1971, abandoned.

[52] U.S. Cl. ......... 208/11 LE; 260/515 H; 260/525
[51] Int. Cl.$^2$ .................................... C10G 1/04
[58] Field of Search ........................................ 208/11

[56] References Cited

UNITED STATES PATENTS

| | | | |
|---|---|---|---|
| 1,615,121 | 1/1927 | Fyleman | 208/11 |
| 2,957,818 | 10/1960 | Fischer | 208/11 |
| 2,980,600 | 4/1961 | Kelley | 208/11 |
| 3,075,913 | 1/1963 | Scheffel et al. | 208/11 |
| 3,296,117 | 1/1967 | Ross et al. | 208/11 |
| 3,330,757 | 7/1967 | Bichard | 208/11 |
| 3,331,765 | 7/1967 | Canevari et al. | 208/11 |
| 3,556,982 | 1/1971 | Kaminsky et al. | 208/11 |
| 3,644,194 | 2/1972 | Kelly et al. | 208/11 |
| 3,660,268 | 5/1972 | Kelly et al. | 208/11 |

*Primary Examiner*—Delbert E. Gantz
*Assistant Examiner*—James W. Hellwege
*Attorney, Agent, or Firm*—L. S. Van Landingham, Jr.

[57] ABSTRACT

Bituminous sands are intimately contacted with an aqueous medium containing a catalytically effective amount of a novel catalyst to separate the bitumin at temperatures below the decomposition point of valuable hydrocarbons contained therein. Usually the temperatures of separation are not higher than 100°C and preferably are about 40°–90°C. The catalyst used in practicing the present invention may be prepared by steps including admixing a water soluble alkali metal silicate with an aqueous medium containing carefully controlled amounts of dissolved water soluble substances which are sources of calcium ion and magnesium ion, reacting the same to produce an aqueous colloidal suspension of the reaction product, admixing a micelle-forming surfactant with the aqueous medium, and agitating the aqueous medium containing the colloidal particles and surfactant to form catalyst containing micelles.

28 Claims, No Drawings

METHOD OF SEPARATING BITUMIN FROM BITUMINOUS SANDS AND PREPARING ORGANIC ACIDS

RELATED APPLICATIONS

This application is a continuation-in-part of copending application Ser. No. 317,097, now U.S. Pat. No. 3,893,943 filed Dec. 20, 1972 on behalf of John W. Willard, Sr. for Novel Catalyst And Process For Preparing The Same. Application Ser. No. 317,097, in turn, is a Continuation application of Ser. No. 108,198, filed Jan. 20, 1971, now abandoned.

BACKGROUND OF THE INVENTION

This invention broadly relates to an improved method of separating bitumin from bituminous sands at temperatures sufficiently low to prevent thermal decomposition of the hydrocarbon content. The invention further relates to a method of preparing organic acids such as humic acids and asphaltic acids and the recovery thereof as a byproduct.

A number of large deposits of bituminous sands are known to the oil and mining industry such as the Athabaskan or Canadian tar sands and the bituminous sands found in the Vinta basin of Utah and Colorado and especially in the vicinity of Vernal, Utah. These deposits contain many billions of tons of bituminous sands and it has been long recognized that the deposits would be very valuable provided an economical method of separating the bitumin from the sand was available. A variety of methods have been proposed heretofore. In accordance with one method, the bituminous sands are retorted at high temperatures which result in the destructive distillation of the bituminous content and valuable hydrocarbons contained therein are thermally decomposed and can not be recovered for sale. Thus, the retorting or destructive distillation method has not been successful to date from the economic standpoint.

Low temperature methods of recovering the bitumin content have also been proposed heretofore. However, they have not been entirely successful as there was no known way of economically separating the bitumin which adheres tightly to the sand particles. As a result, solvents have been used to dissolve the bitumin content and leave the sand particles behind as a residue. The solvent is used to treat the entire volume of the bituminous sand and it is costly as a large amount of solvent is lost in the sand residue and the dissolved bitumin must be recovered from the solution by distillation. Attempts to use nonsolvents such as water have not been successful heretofore as only a small percentage of the bitumin content could be separated thereby rendering the process uneconomic as well as inefficient.

The present invention provides an inexpensive and entirely satisfactory method of recovering bitumin from bituminous sands at temperatures far below the decomposition temperature of the valuable hydrocarbon content. The method employs a unique and highly effective technique for breaking the bonds between the bitumin and the sand particles, thereby allowing the bitumin to be easily separated from the sand. The separated bitumin may be further treated in accordance with prior art processes to produce synthetic petroleum, or to produce products for use in the chemical industry, the rubber industry, road building and the like.

It is an object of the present invention to provide a novel method of economically separating bitumin from bituminous sand which employs temperatures far below the decomposition temperature of the valuable hydrocarbon content.

It is a further object to provide a novel method of treating bituminous sands whereby the bonds which cause the bitumin to adhere tightly to the sand particles may be broken and the surface properties and/or characteristics of the sand particles and/or bitumin may be altered so that the bitumin may be easily separated from the sand.

It is a further object to provide a novel method wherein bituminous sands are intimately contacted with an aqueous medium containing a novel catalyst at temperatures below the decomposition temperature to separate a plurality of butumin fractions of increasing viscosity and/or molecular weight from the residual sand fraction.

It is a further object to prepare and recover valuable organic acids from bituminous sands.

Still other objects and advantages of the invention will be apparent to those skilled in the art upon reference to the following detailed description and the specific examples which are for purposes of illustration only.

DETAILED DESCRIPTION OF THE INVENTION INCLUDING PREFERRED VARIANTS THEREOF

The specific composition and properties of bituminous sands vary somewhat from deposit to deposit. However, in every instance they contain bitumin which adheres tightly to sand particles to thereby form a coherent mixture which has a specific gravity greater than one. The resulting mixture could not be separated heretofore into bitumin, which usually has a specific gravity less than one, and a heavy sand residue by a method employing an aqueous medium and temperatures below the thermal decomposition temperature of the bitumin.

The novel aqueous catalyst suspensions of the invention have the unique property of penetrating the above described bituminous sand in particulate form, and, in some manner which is not fully understood at the present time, reacting therewith at active sites which results in the breaking or altering of the bonds holding the bituminous material to the sand particles to thereby allow the bitumin and sand particles to be separated upon agitation in an aqueous medium at the proper temperature. It is known the catalyst treated bitumin is in a highly reactive state and that it has been altered in some respects which appear to include the absorbtion of water, the presence of hydroxyl groups, and/or oxidation. In any event, the catalyst treated altered bitumin fraction no longer adheres tightly to the sand particles and it is possible to easily separate the sand particles from the bitumin by gentle agitation in the aqueous catalyst suspension at the proper temperature. It will be appreciated that there are preferred procedures and conditions which may be used in practicing the basic method of the invention and such will be discussed in greater detail hereinafter. Also, the novel catalyst which is used in practicing the invention and the preparation thereof will be discussed in greater detail hereinafter.

In practicing one presently preferred variant of the invention, freshly mined bituminous sand is subdivided into particles of a size which may be handled conveniently, such as particles having a diameter not greater than four inches and preferrably less than 1 inch. Shorter soaking periods in the aqueous catalyst suspension may be achieved by reducing the particle size still further such as to minus three mesh or minus four mesh (Tyler screen), or to even smaller particles.

The sized bituminous stand is intimately contacted with an aqueous suspension of the catalyst over a period of time sufficient for the catalyst suspension to penetrate the bituminous sand particles. The soaking period will vary with the particle size and the specific bituminous sand being treated. However, usually a soaking period varying from approximately 5 minutes to 10 hours is sufficient. It is understood that the minimum soaking period is the time required for the aqueous catalyst suspension to penetrate the bituminous sand particles and react therewith sufficiently to allow the bitumin and the sand particles to be separated, regardless of the period of time required for this purpose. The upper limit on the soaking period is practical in nature and continued treatment of the bituminous sand particles with the aqueous suspension of the catalyst does not adversely affect the separation process.

The pH value of the aqueous catalyst suspension may vary over wide ranges and may be, for example, between 1 and 13.5. As a general rule, alkaline aqueous catalyst suspensions give better results and thus the pH value should be greater than 7.0 in most instances. A pH value greater than 8.0 usually gives still better results, and in most instances the pH value should be about 8–13.5 and preferably 8–10. It is understood that the above are initial pH values of the aqueous catalyst suspension. The pH value drops as the reaction proceeds and usually the used acqueous catalyst suspension has a final pH value of approximately 5.5–6.8 regardless of the initial level.

The amount of catalyst in the aqueous medium may vary over wide ranges as it is only necessary that a catalytic amount be present. As a general rule, the aqueous medium may contain about 0.0001–1% of the catalyst by weight, but larger or smaller amounts may be present when desired. The aqueous catalyst suspension as prepared by the process described hereinafter may be used when desired. However, it is usually preferred to dilute it with large amounts of water, such as with about 10–3,000 volumes of water for each volume of the catalyst suspension as initially prepared. In some instances, a diluted catalyst suspension containing about 10–30 volumes of water for each volume of the catalyst suspension as initially prepared is preferred, but usually larger quantities of water should be added such as 500–1000 volumes.

The temperature at which the aqueous catalyst suspension is contacted with the bituminous sand particles during the soaking period is not critical. Any suitable temperature at which liquid phase conditions may be maintained is satisfactory, such as 0°–100°C, and ambient temperatures are usually preferred. If desired, the soaking period may be conducted under pressure at higher temperatures.

The resulting admixture of soaked bituminous sand and aqueous catalyst suspension is subjected to an elevated temperature at which the bitumin will separate from the sand particles upon agitation. The minimum separation temperature is that temperature at which the bitumin will separate from the sand with agitation and it is usually approximately 20°C to 30°C. The maximum temperature is the boiling point of the aqueous medium under the existing pressure conditions. As a general rule, a temperature of about 30°–100°C and preferably about 40°–90°C will cause a bitumin fraction to separate upon agitation. The bitumin fractions separated at lower temperatures usually have lower molecular weights and lower viscosities than the fractions separated at higher temperatures. Thus, it is possible to fractionate the bitumin into a light oily fraction, at least one heavier oily fraction, and a final solid bitumin fraction which may have properties similar to those of asphalt or tar.

The amount of aqueous catalyst suspension that is contacted with the bituminous sand may vary over wide ranges. During the soaking period, it is only necessary that sufficient aqueous catalyst suspension be present to thoroughly wet and penetrate the bituminous sand particles. However, during the bitumin separation step, it is preferred that sufficient aqueous catalyst suspension be present to form a liquid phase above the bituminous sand. Inasmuch as the bituminous sand particles usually have a specific gravity greater than one initially, and the bitumin after separation usually has a specific gravity less than one, the separated bitumin floats upward to the surface of the aqueous phase where it may be removed by skimming, decanting, floating off, or other suitable method. The heavier sand fraction remains in the bottom of the aqueous phase and may be recovered after the bitumin fraction has been separated.

In instances where the bituminous sand is weathered or the bitumin content is oxidized and/or highly polymerized, it is often desirable to modify the bitumin separation step by adding an organic solvent for bitumin to the aqueous medium. Preferably, the organic solvent is substantially water insoluble and has a specific gravity less than that of the aqueous medium to thereby form an organic solvent layer floating on the surface of the aqueous medium. The organic solvent should be present in an amount sufficient to dissolve the bitumin content of the bituminous sand to be contacted therewith. Hydrocarbon solvents for bitumin containing about 6–20 carbon atoms are usually preferred including aromatic hydrocarbons such as benzene, toluene and xylene, and open chain saturated or unsaturated hydrocarbon solvents having a carbon chain length of about 5–20 carbon atoms. The organic solvent should be in the liquid phase under the existing conditions. Petroleum distillate fractions are usually preferred and especially inexpensive commercially available products such as gasoline, kerosene, diesel oil, light fuel oil or gas oil and specialized solvents such as SKELLY SOLVE T. Halogenated hydrocarbon solvents having the same carbon chain length and configuration as the aforementioned hydrocarbons or carbon disulfide also may be used.

In instances where a water insoluble organic solvent is present as a layer floating on top of the aqueous catalyst suspension, it is preferred that presoaked bituminous sand particles be agitated gently in the aqueous phase. The bitumin is released and floats upward through the aqueous phase due to its lower specific gravity until it reaches the liquid-liquid interface between the aqueous phase and the organic solvent phase. Upon contacting the organic solvent, it dissolves therein to thereby form a bitumin solution. The degree of agitation is preferably such that the organic solvent does not contact the entire volume of bituminous sand, but rather only the released bitumin and the sand remains in the aqueous medium. The method of the invention is far more efficient than the prior art solvent processes wherein the organic solvent is admixed with the entire volume of the bituminous sand. Also, the sand residue does not retain any of the organic solvent and solvent losses are reduced markedly. The resulting solvent solution of bitumin may be decanted from the aqueous phase and the bitumin content may be recovered by distillation. The fresh organic solvent thus obtained may be recycled in the process and used to treat additional bituminous sand.

The separated bitumin may be processed in accordance with prior art practices to produce commercially valuable products. For instance, it is possible to produce synthetic petroleum therefrom by prior art processes which are well known to the oil industry. It is also possible to produce an asphalt fraction which may be used in road building. It is also possible to leave sufficient bitumin in the sand residue so as to produce a road building material directly.

In accordance with a further variant of the invention, it is possible to recover organic acids from the used aqueous catalyst suspension following the bitumin separation step. This may be conveniently accomplished by decanting the used aqueous catalyst suspension, which usually has a pH value of about 6, and adding a strong inorganic acid such as hydrochloric acid or sulfuric acid to lower the pH value sufficiently to precipitate the organic acids. A pH value not greater than about 3 is usually preferred and for most humic and asphaltic acids, a pH value of approximately 1–2 is very satisfactory. The resulting precipitated organic acids may be recovered by filtration, and may be washed and dried to produce a crude organic acid product. The crude organic acids may be purified in accordance with prior art practice, such as by recrystallization from solvents, to produce humic acids, asphaltic acids, and the like of sufficient purity for sale. The resulting purified organic acids have well recognized industrial uses and thus are valuable byproducts.

The filtrate from the above described organic acid recovery step may be adjusted to the initial pH of the fresh aqueous catalyst suspension, i.e., a pH value of approximately 8–13.5 and preferably about 8–10 by addition of an inorganic base such as sodium or potassium hydroxide. The reconstituted aqueous medium and catalyst thus produced is then recycled as the aqueous catalyst suspension to the bituminous sand soaking step and the bitumin separation step. Surprisingly, the used and reconstituted aqueous catalyst suspension is more effective than fresh aqueous catalyst suspension. The reason for this is not fully understood at the present time. However, it appears there is an initial activation period during which little or no reaction occurs between the aqueous catalyst suspension and the active sites of the bituminous sand. The activation period appears to be eliminated when recycled aqueous catalyst suspension is used and thus it is more effective.

It is usually preferred that gentle agitation be used during the bitumin separation step. However, it is understood that the agitation is sufficiently vigorous to achieve the desired separation between the sand particles and the altered bitumin. For example, the degree of agitation may be increased as necessary until it is sufficiently vigorous to result in the desired separation. In instances where an organic solvent is used, it is preferred that the agitation be kept sufficiently mild, and the point of agitation at a sufficiently low level in the aqueous phase, so as to allow the organic solvent phase to remain intact and floating on the aqueous phase. Often some intermixing of the two liquid phases may occur without adverse effects. Also, particles of the bituminous sand may temporarily enter the organic solvent phase.

It is essential that an aqueous medium containing the novel catalyst described hereinafter be used in practicing the present invention. Otherwise, it is not possible to rapidly break the bonds between the bitumin and the sand particles and/or to alter the surface properties and/or characteristics in such a manner as to effect a suitable separation thereof.

PREPARATION OF THE CATALYST

The catalyst used in practicing the present invention may be prepared as described below. In the presently preferred process for preparing an aqueous suspension of the catalyst, a water soluble alkali metal silicate is admixed and reacted with an aqueous solution of a water soluble dissolved substance which is a source of calcium ion and a water soluble dissolved substance which is a source of magnesium ion to produce a finely divided or colloidal suspension of the reaction product. The aqueous solution contains the dissolved substances initially in amounts to provide between about $1 \times 10^{-4}$ and $1 \times 10^{-1}$ mole per liter each of calcium ion and magnesium ion, preferably between about $1 \times 10^{-3}$ and $1 \times 10^{-2}$ mole per liter, and for still better results between $1 \times 10^{-3}$ and $6 \times 10^{-3}$ mole per liter. The dissolved substances should also be present in amounts to provide a molar ratio of calcium ion to magnesium ion between about 2.0:1.0 and 1.0:2.0, and preferably about 1.5:1.0 and 1.0:1.5. For best results, the aqueous medium should contain the dissolved substances in amounts to provide between about $2.5 \times 10^{-3}$ and $3.0 \times 10^{-3}$ mole per liter each of calcium ion and magnesium ion, and the molar ratio of calcium ion to magnesium ion should be about 1.0:1.0, e.g., $2.9 \times 10^{-3}$ mole per liter of calcium ion and $2.7 \times 10^{-3}$ mole per liter of magnesium ion. The alkali metal silicate should have an alkali metal oxide to silicon dioxide ratio between about 0.9:1.0 and less than 2.0:1.0, and preferably between about 0.9:1.0 and 1.2:1.0 The alkali metal silicate should be admixed with the aqueous medium in an amount of about 0.05–2 moles per liter, preferably about 0.1–1 mole per liter, and for still better results about 0.2–0.5 mole per liter. For best results, the alkali metal silicate should be an alkali metal meta-silicate having an alkali metal oxide to silicon dioxide ratio of about 1:1, and it should be admixed with the aqueous medium in an amount to provide about 0.2–0.3 mole per liter, e.g., about 0.25 mole per liter.

Examples of sources of calcium ion and magnesium ion for use in preparing the aqueous solution include mineral acid salts such as the halides, sulfates, bisulfates, nitrites, and nitrates of calcium and magnesium. The chlorides are usually the preferred halides, and both calcium and magnesium chloride are soluble and may be used. Magnesium sulfate and bisulfate are soluble and often are the preferred source of magnesium ion. Calcium sulfate is only slightly soluble in water and usually is not a preferred source of calcium ion, but calcium bisulfate is somewhat more soluble. While calcium and magnesium nitrite or nitrate are soluble in water and may be used, these substances are not preferred in most instances. The sources of calcium ion and magnesium ion are dissolved in the aqueous medium in amounts to provide calcium ion and magnesium ion within the above ranges. Complete ionization is assumed when calculating the quantities to be dissolved and any desired order of addition is satisfactory. For example, the source of calcium ion may be added to the aqueous medium before, during or after the source of magnesium ion.

The alkali metal silicate to be admixed with the aqueous medium is preferably a water soluble sodium or potassium silicate having an alkali metal oxide ($M_2O$) to silicon dioxide ($SiO_2$) mole ratio between about 0.9:1.0 and less than 2.0:1.0, and preferably between about 0.9:1.0 and 1.2:1.0. The best results are usually obtained with an alkali metal metasilicate having an alkali metal oxide to silicon dioxide ratio of about 1:1. Hydrated alkali metal silicates dissolve faster and should be used for best results when the alkali metal silicate is added in solid form. In instances where an anhydrous alkali metal silicate is used, it may be desirable to dissolve it in water and then add the solution to the aqueous medium. Sodium metasilicate is preferred and usually a hydrated sodium metasilicate such as the pentahydrate gives the best results.

Carbonate ion and/or bicarbonate ion should not be present in the aqueous medium in substantial concentrations as the calcium ion and magnesium ion are precipitated in the form of their respective carbonates. The free carbonate ion and/or bicarbonate ion concentrations in the aqueous medium should not exceed about 10 parts per million by weight based upon the combined weight of the water and the ingredients added thereto and for this reason, the alkali metal silicates should be substantially free of carbonate ion and bicarbonate ion. A small amount of precipitated calcium carbonate and/or magnesium carbonate may be present in the aqueous medium provided additional calcium ion and magnesium ion are available to meet the above defined concentrations.

Distilled water and/or deionized water are usually preferred over a natural or untreated water when preparing the aqueous medium. In instances where water is used which contains substantial initial concentrations of alkaline earth metal ions, then this should be taken into consideration in calculating the amounts of the sources of calcium ion and magnesium ion which are necessary to arrive at the final concentrations previously discussed.

An electrolyte which aids in the preparation of colloidal suspension may be present in the aqueous medium at the time of admixing the alkali metal silicate therewith. Examples of electrolytes include those used in preparing prior art colloidal suspensions such as the alkali metal halides, sulfates and bisulfates. Sodium chloride, sodium sulfate and sodium bisulfate are usually preferred. The electrolyte should be added in small amounts such as, for example, about 0.00001–0.1 mole per liter, but often larger or smaller amounts may be present.

The conditions under which the alkali metal silicate is admixed with the aqueous medium and reacted with the sources of calcium ion and magnesium ion are not critical provided the reaction mixture is maintained in the liquid phase. The reaction temperature may be, for example, between the freezing point and boiling point of water under the existing pressure conditions. At atmospheric pressure, the temperature is usually about 10°–90°C and often a more convenient temperature is about 20°–50°C. In many instances, ambient or normal room temperature is satisfactory.

The degree of agitation is not critical, and mild to vigorous agitation may be employed during addition of the alkali metal silicate. For the best results, the aqueous medium should be agitated sufficiently to assure rapid and uniform admixing of the alkali metal silicate. After completing the addition of the alkali metal silicate, when desired the agitation may be continued for a sufficient period of time to assure complete reaction and aging of the resulting colloidal suspension, such as for approximately 1–5 minutes to one hour or longer.

Upon admixing the alkali metal silicate with the aqueous medium, it takes on a turbid appearance but in most instances no significant amount of visible precipitate is formed. The colloidal suspension of the reaction product thus produced should be strongly basic and may have a pH value of, for example, approximately 10–14 and preferably about 11–13, and for best results about 12. In view of this, the initial pH value of the aqueous medium containing the dissolved sources of calcium ion and magnesium ion is of importance and should be about 6–9 and preferably about 7–8. When necessary, it is possible to adjust the pH value of the aqueous medium to the foregoing levels either before during or after addition of the alkali metal silicate by adding bases such as sodium or potassium hydroxide, or mineral acids such as sulfuric or hydrochloric acid.

The colloidal suspension may be stored for several weeks or longer while awaiting the further treatment described hereinafter. In instances where the colloidal suspension is to be stored over a substantial period of time, the pH value should be maintained at the above described level and the storage vessel is preferably a tightly capped polyethylene bottle or other inert plastic container which prevents the contents from absorbing carbon dioxide from the atmosphere.

The colloidal suspension of the reaction product is not suitable for use as a catalyst as prepared and it should be agitated sufficiently in the presence of a micelle-forming surfactant to form catalyst-containing micelles. The degree of agitation, the length of the agitation period, and the amount of the micelleforming surfactant that is present in the colloidal suspension are controlled at levels favorable to the formation of micelles. For example, the surfactant may be present in an amount of about 0.001–0.1 mole per liter and preferably about 0.03–0.07 mole per liter for most surfactants. Smaller or larger amounts may be effective with some surfactants such as 0.0001 mole per liter or less, or 0.2 mole per liter or more. About 0.05 mole per liter often gives the best results with many surfactants.

The minimum period of agitation and the minimum degree of agitation that are required for micelle formation varies somewhat with temperature and the type and amount of surfactant. As is well understood in this art, gradually increasing these variants in the presence of an effective amount of the micelle-forming surfactant will result in micelle formation when the proper levels are reached. As a general rule, longer periods of agitation and/or more vigorous agitation are required to form micelles at lower temperatures approaching the freezing point of the colloidal suspension than at higher temperatures approaching the boiling point. In instances where the aqueous suspension has a temperature of approximately 50°–90°C., then mild agitation over a period of about 10–60 minutes is satisfactory. Often longer or shorter periods of mild to vigorous agitation may be employed such as from about 1–5 minutes to several hours at temperatures varying, respectively, between the boiling point and the freezing point. When desired, the agitation may be continued long after the catalyst-containing micelles are formed as continued agitation does not seem to have an adverse affect.

As a general rule, the micelle-forming surfactants known in the prior art may be used in practicing the present invention. Micelle-forming surfactants used in the emulsion polymerization of monomeric organic compounds are disclosed in the text Synthetic Rubber, by G. S. Whitby, et al, John Wiley & Sons Incorporated, New York (1954), and surface active agents in general are disclosed on pages 418–424 of the text Organic Chemistry, Fieser and Fieser, 2nd Edition, Reinhold Publishing Corporation, New York, New York (1950), the disclosures of which are incorporated herein by reference. Examples of surfactants disclosed in the above texts include the alkali metal soaps of long chain fatty acids, and especially the sodium and potassium soaps of fatty acids containing about 14–25 carbon atoms and preferably about 16–18 carbon atoms, and the sodium and potassium soaps of the rosin acids, abietic acid and the derivatives thereof. Other micelle-forming surfactants include fats and oils such as corn oil, cotton seed oil, castor oil, soy bean oil and safflower oil which have been fully or partially saponified with alkali metal bases to produce mixtures including saponified long chain fatty acids, the mono- or di-glycerides thereof, and glycerin.

Examples of synthetic micelle-forming surfactants include the sulfonates of long chain alcohols prepared by hydrogenation of naturally ocurring fats and oils of the above types and especially sulfonated long chain alcohols containing about 10–20 and preferably about 12–14 carbon atoms, the alkali metal salts of the monosulfonates of monoglycerides such as sodium glyceryl monolaurate sulfonate, the sulfonates of succinic acid esters such as dioctyl sodium sulfosuccinate and the alkylaryl alkali metal sulfonates. Specific examples of presently preferred micelle-forming surfactants include sodium and potassium sulforicinoleate, tetrahydronaphthalene sulfonate, octahydroanthracene sulfonic acid, butyl naphthalene sulfonic acid, sodium xylene sulfonate, alkyl benzene sulfonic acid and potassium benzene sulfonate.

Sulfated long chain hydroxycarboxylic acids containing about 14–25 carbon atoms and preferably about 16–18 carbon atoms, and sulfated fats and oils containing hydroxycarboxlic acids of this type produce exceptionally good micelle-forming surfactants. At least 25% of the hydroxyl groups and preferably at least 50% should be sulfated, and up to 95–100% may be sulfated. It is usually preferred that the sulfated oils and/or long chain hydroxycarboxylic acids be neutralized with an alkali metal base, and that the corresponding alkali metal salts be added to the colloidal suspension in the form of an aqueous solution. The aqueous solution may contain at least 25% of water and preferably at least 35–40% by weight. Much larger percentages of water may be present when desired such as 75–80% or more by weight.

A very active catalyst is produced when using sulfated castor oil as the micelle-forming surfactant (Turkey Red oil). Sulfated castor oil which has been purified sufficiently to be of U.S.P. or medicinal grade produces an exceptionally active catalyst. For the best results, the castor oil is reacted with about an equal weight of concentrated sulfuric acid (e.g., 20% by weight) at a temperature of approximately 25°–30°C. The mixture may be reacted for about 2 hours with stirring and is then neutralized with sodium hydroxide solution. The reaction mixture separates into three layers, i.e., an upper layer which is a water solution, an intermediate or oily layer, and a white curdy precipitate. The intermediate oily layer is separated from the upper and lower layers, and may be added to the colloidal suspension as the micelle-forming surfactant, in an amount, for example, of 0.001–0.1 mole per liter, and preferably about 0.005 mole per liter.

The activity of the catalyst may be increased very markedly by cooling the aqueous catalyst suspension to a temperature approaching the freezing point such as about 0°–10°C., and then warming over one or more cycles. For best results, the aqueous catalyst suspension should be frozen and thawed over one or more cycles. The reason for the increased catalytic activity is not fully understood at the present time but cooling and then warming the aqueous catalyst suspension seems to increase the concentration of the catalyst-containing micelles and/or increases the catalytic activity thereof.

The aqueous suspension of the catalyst contains a relatively small percentage by weight of the active catalyst as produced. When desired, it may be concentrated by evaporating a portion of the water to produce a concentrated liquid catalyst suspension which may be stored and used more conveniently. It is also possible to prepare a dry catalyst concentrate by evaporating substantially all of the water. The preferred method of producing the dry catalyst concentrate is by flash evaporation using a technique analogous to that employed in preparing powdered milk. The catalyst concentrates produced upon partial or complete evaporation of the water content of the initially prepared aqueous suspension may be reconstituted by addition of water with little or no loss of catalytic activity. Preferably, the water is added to the dry catalyst concentrate under sufficiently vigorous conditions of agitation to assure that the catalyst micelles are resuspended and uniformly distributed.

The aqueous catalyst suspension may be used as produced in practicing the invention, but preferably it is diluted with approximately 100–10,000 parts by weight of water and then used. For better results, the catalyst suspension should be diluted with about 250–2,000 parts by weight of water before use, and for best results it should be diluted with about 500–1,000 parts by weight of water before use. The surface active agent may be added thereto when desired as previously discussed. Alternatively the dry catalyst or liquid catalyst concentrate may be admixed with water and/or the surface active agent to provide an effective catalyst concentration in the quantities previously discussed. The weight of the catalyst is calculated on a dry solids basis, i.e., the weight of the catalyst ingredients in the aqueous suspension as produced after removal of the water.

The invention is further illustrated by the following specific examples.

EXAMPLE I

This example illustrates one presently preferred process for preparing the novel catalyst used in practicing the invention.

Anhydrous calcium chloride in an amount of 0.66 gram and magnesium sulfate heptahydrate in an amount of 1.32 grams were dissolved in two liters of deionized water with stirring and warming until solution was complete. Then 95 grams of sodium silicate pentahydrate having a molecular ratio of sodium oxide to silicon dioxide of 1:1 were added to the solution with stirring and continued warming to produce a white colloidal suspension of the reaction product.

After setting for 10 minutes, the colloidal suspension was heated to 80°C. and sulfated castor oil in an amount of 50 grams was added with stirring. The average molecular weight of the sulfated castor oil was 940 and it contained 50% of water. The turbidity lessened somewhat as the colloidal suspension was heated at 80°–90°C. for one hour with vigorous stirring to produce catalyst micelles. The aqueous suspension of catalyst micelles thus prepared had a viscosity similar to that of water and it was used as the catalyst in certain Examples as noted hereinafter.

A dry or solid catalyst concentrate was prepared in a further run by evaporating water from the initially prepared aqueous catalyst suspension. The resulting dry catalyst concentrate was resuspended in water and there was no substantial loss of catalytic activity. In still other runs, the catalytic activity of the aqueous suspension of catalyst as initially prepared, the diluted aqueous suspension of catalyst, and the reconstituted aqueous catalyst suspension was enhanced by freezing and thawing.

EXAMPLE II

This example illustrates the preparation of additional catalyst suspensions.

Five suspensions of the catalyst were prepared from the same ingredients as used in Example I and following the general procedure of Example I. The ratios of ingredients were varied as follows:

| Ingredient | Amount of Ingredient | | | | |
|---|---|---|---|---|---|
| | Run 1 | Run 2 | Run 3 | Run 4 | Run 5 |
| Deionized water | 2 l | 1.5 l | 1.5 l | 1.5 l | 0.25 l |
| $CaCl_2$ | 0.66 g | 0.5 g | 0.5 g | 1.0 g | 0.5 g |
| $MgSO_4.7H_2O$ | 1.32 g | 1.0 g | 1.0 g | 2.0 g | 1.0 g |
| $Na_2SiO_3.5H_2O$ | 165 g | 132 g | 71 g | 185 g | 71 g |
| Sulfated Castor oil (approximately 50% by weight $H_2O$) | 100 ml | 150 ml | 150 ml | 200 ml | 150 ml |

The catalyst suspensions prepared by the above five runs were used in certain examples as noted hereinafter.

EXAMPLE III

This example illustrates the separation of bitumin from freshly mined unweathered bituminous sand taken from a deposit near Vernal, Utah known as Asphalt Ridge. The average bitumin content was 12.8% by weight as determined by extraction with carbon disulfide.

The as mined butuminous sand was reduced in particle size to minus four mesh and 64 pounds thereof was soaked over night at room temperature in 8 gallons of a diluted aqueous catalyst suspension. The diluted aqueous catalyst suspension was prepared by adding 1,000 gallons of water to one gallon of the catalyst suspension as prepared in accordance with Example I. The bituminous sand was thoroughly penetrated by the diluted catalyst suspension and the bonds between the sand particles and the butumin were broken. The resulting altered bitumin could be easily removed from the sand particles by gentle agitation.

The admixture of the aqueous catalyst suspension and the soaked bituminous sand was placed in a vessel and heated to 30°C with gentle agitation provided by a laboratory-type stirer. At this temperature, a light oil separated and floated to the surface of the catalyst suspension which covered the bituminous sand. The first oily fraction was removed by skimming. The temperature was increased to 50°C and the gentle agitation was continued. A second oily fraction separated and floated to the surface of the catalyst suspension and was also removed by skimming. A third oily fraction was separated by raising the temperature to 75°C with continued gentle agitation. The third oily fraction rose to the surface and was removed by skimming. The temperature of the catalyst suspension was then raised to 90°–95°C with continued gentle agitation. The remainder of the bitumin separated and floated to the surface and was recovered by skimming. The residual sand was substantially free of bitumin as determined microscopically and thus the separation was complete.

The three oily fractions and the final heavy bitumin fraction were examined. It was found that the lightest oily constituents were recovered in the first fraction, an intermediate oily fraction was recovered as the second fraction, and a viscous heavy oil fraction was recovered as the third fraction. The final fraction did not have substantial oily properties and resembled tar or asphalt. Thus the method of the invention is capable of removing substantially the entire bitumin content from the bituminous sand and, at the same time, fractionating the same into a plurality of fractions of increasing molecular weight and viscosity.

EXAMPLE IV

This example illustrates the unique ability of the aqueous catalyst suspension of the invention in penetrating large pieces of bituminous sand and breaking the bonds between the bitumin and the sand particles.

Pieces of the bituminous sand of Example III having a diameter of approximately four inches are soaked over night in diluted aqueous catalyst suspension prepared in accordance with Example I. The pieces of bituminous sand are thoroughly penetrated by the catalyst suspension and may be disintergrated by gentle agitation to release the bituminous content.

The soaked pieces of bituminous sand are treated in accordance with Example III to recover the bitumin content. Comparable results are obtained and thus it is not always necessary to reduce the bituminous sand to small pieces in instances where sufficient time can be allowed for the catalyst suspension to penetrate the larger particles.

EXAMPLE V

This example illustrates the use of the catalyst suspension in separating bitumin from successive portions of the bituminous sand and the recovery of humic acids and asphaltic acids from the used catalyst suspension.

The general procedures procedure Example III was repeated to recover the bitumin and thereafter the used aqueous catalyst suspension was separated from the bitumin-free sand particles. The initial pH of the catalyst suspension was about 10 and it was clear, and the used catalyst suspension was straw colored and the pH was approximately 6. The used catalyst suspension was acidified with concentrated sulfuric acid to a pH of 1-2 and insoluble organic acids including humic acids and asphaltic acids precipitated. The precipitated acids were separated by filtration, washed and dried. The acidic filtrate was neutralized with sodium hydroxide to a pH of 8-10, which was approximately the pH of the catalyst suspension at the beginning of the first run, to reconstitute the catalyst suspension.

The reconstituted aqueous catalyst suspension was recycled in a second run following the general procedure of Example III. The recycled aqueous catalyst suspension was more effective than the freshly made catalyst suspension used initially.

The above procedure was repeated seven times using the same catalyst suspension without any decrease in effectiveness. In fact, the used catalyst suspension appeared to become more effective as the recycling proceeded.

The crude mixture of organic acids could be separated by recrystallization in solvents into a humic acid fraction and an asphaltic acid fraction and used in accordance with prior art practice.

EXAMPLE VI

This example illustrates the separation of bitumin from weathered bituminous sand which contained the bitumin fraction in an oxidized or polymerized state. The bituminous sand used in this example came from the same source as that of Example III but it had been stored in the open for approximately 6 years.

The aged and altered bituminous sand was broken into pieces having a diameter of ½ inch or less and introduced into boiling diluted aqueous catalyst suspension prepared by diluting the catalyst suspension as prepared in Example I with 1,000 volumes of water. The temperature of the mixture after introducing the bituminous sand particles therein was 85°C and after a ten minute soaking period, the termperature had decreased to 65°C.

The soaked bituminous sand was transferred to a vessel containing additional hot diluted aqueous catalyst suspension covered with a petroleum distilute boiling in the kerosene range. The petroleum distilute was present in an amount sufficient to dissolve the bitumin content and it floated on top of the aqueous catalyst suspension as a separate layer. The resulting admixture was stirred with a propeller-type stirer operating at about 150 revolutions per minute for 10 minutes at which time clean sand was observed. The liquid-liquid interface between the aqueous phase and the petroleum distillate phase was largely intact but a few beads of petroleum distillate could be seen in the aqueous phase. The bitumin fraction was released from the sand particles and rose upward to the liquid-liquid interface, and then dissolved in the petroleum distillate to form a solution. The agitation was sufficiently mild so that the petroleum distillate was not contacted with the entire volume of bituminous sand and in fact only a very small percentage of the bituminous sand was intimately contacted with the petroleum distillate phase.

The separation of the bitumin was complete at a temperature of 80°-90°C after 10 minutes of stirring and it was not necessary to use higher temperatures. At temperatures below 80°C, the separation was slow and much faster and better results were achieved at temperatures of 80°C and higher. The aqueous phase and the solution of bitumin in the petroleum distillate were decanted. The sand particles were washed with a small portion of the petroleum distillate to remove small amounts of bitumin. The solution of bitumin in petroleum distillate was separated from the aqueous phase and the bitumin content was recovered by distillation. It was possible to recycle both the aqueous phase after pH adjustment with sodium hydroxide to about 8-10, and the recovered petroleum distillate in subsequent runs in a manner similar to that described in Example V.

The procedure of this Example was repeated with the exception of omitting the petroleum distillate and using only the aqueous phase containing the catalyst. It was possible to separate a large percentage of the bitumin when operating in this manner, but the separation was not as complete as when the petroleum distillate was present.

EXAMPLE VII

The general procedures of Examples III and VI are repeated with the exception of omitting the catalyst from the aqueous phase and using only water adjusted to a pH of about 10 with sodium hydroxide. It was not possible to separate substantial amounts of bitumin from the sand when attempting to operate in the absence of the catalyst.

EXAMPLE VIII

The general procedures of Examples III and VI are repeated with the exception of using the catalyst suspension prepared by Example II. Comparable results to those reported in Examples III and VI are obtained with the Example II catalysts.

I claim:
1. A method of separating bitumin from bituminous sand containing an intimate admixture of bitumin and sand comprising the steps of intimately contacting the bituminous sand with an aqueous medium containing a catalytically effective amount of a catalyst until the aqueous medium penetrates the bituminous sand and the bitumin will separate from the sand, thereafter agitating the bituminous sand in the aqueous medium to separate the bitumin from the sand, the temperature of the aqueous medium during the agitation step being sufficiently elevated whereby the bitumin separates from the sand, and recovering the separated bitumin from the aqueous medium, the said catalyst being prepared by a process comprising admixing a water soluble alkali metal silicate with an aqueous medium containing a dissolved substance which is a source of calcium ion and a dissolved substance which is a source of magnesium ion, the aqueous medium containing said dissolved substances in amounts to provide between about $1 \times 10^{-4}$ and $1 \times 10^{-1}$ mole per liter each of calcium ion and magnesium ion, the aqueous medium containing said dissolved substances in amounts to provide a molar ratio of calcium ion to magnesium ion between about 2.0:1.0 and 1.0:2.0, the alkali metal silicate having an alkali metal oxide to silicon dioxide ratio between about 0.9:1.0 and less than 2.0:1.0 and being admixed with the aqueous medium in an amount of about 0.05-2 moles per liter, the alkali metal silicate reacting with said dissolved substances providing calcium ion and magnesium ion to thereby produce an aqueous suspension of finely divided particles of a reaction product, admixing a micelle-forming surfactant with the aqueous medium in an amount to form catalyst micelles comprising said finely divided particles of the reaction product upon agitating the aqueous medium, and agitating the aqueous medium containing the finely divided particles of the reaction product and surfactant to form said catalyst micelles.

2. The method of claim 1 wherein the pH value of the aqueous medium is above 7.0.

3. The method of claim 1 wherein the pH value of the aqueous medium is about 8–10.

4. The method of claim 1 wherein the temperature of the aqueous medium is about 30°–100°C during the agitation step.

5. The method of claim 1 wherein following the said separated bitumin recovery step, the pH value of the aqueous medium is increased to an alkaline pH value by addition of a strong inorganic base and the aqueous medium is recycled to separate bitumin from an additional portion of the bituminous sand.

6. The method of claim 1 wherein during the agitation step, a first bitumin fraction having a relatively low viscosity is separated at a relatively low temperature, the said first fraction is recovered from the aqueous medium, thereafter at least one additional bitumin fraction having a relatively high viscosity is separated at a relatively high temperature, and said additional bitumin fraction is recovered from the aqueous medium.

7. The method of claim 1 wherein following the said separated bitumin recovery step, the aqueous medium is separated from the residual sand, the pH value of the separated aqueous medium is decreased by addition of a strong inorganic acid until organic acids including humic acids and asphaltic acids contained therein are precipitated and the precipitated organic acids are recovered from the aqueous medium by filtration.

8. The method of claim 7 wherein the recovered precipitated organic acids are purified by recrystallization from a solvent to produce a relatively pure humic acid product and a relatively pure asphaltic acid product.

9. The method of claim 8 wherein the pH value of the filtered aqueous medium is increased to above 7.0 by addition of a strong inorganic base and the aqueous medium is recycled to separate bitumin from an additional portion of the bituminous sand.

10. The method of claim 1 wherein the surface of the aqueous medium extends above the bituminous sand whereby separated bitumin having a specific gravity less than that of the aqueous medium is free to rise to the surface of the aqueous medium and may be recovered therefrom.

11. The method of claim 10 wherein substantially water insoluble organic solvent for bitumin having a specific gravity less than that of the aqueous medium is in intimate contact with the aqueous medium, a layer of the said organic solvent is floating on the surface of the aqueous medium and the separated bitumin is dissolved therein to produce a bitumin solution.

12. The method of claim 11 wherein the bitumin solution is separated from the aqueous medium and the bitumin is recovered from the bitumin solution by distilling off the organic solvent.

13. The method of claim 1 wherein in the process for preparing the catalyst, said ratio of calcium ion to magnesium ion is between about 1.5:1.0 and 1:0:1.5.

14. The method of claim 1 wherein in the process for preparing the catalyst, said ratio of calcium ion to magnesium ion is about 1.0:1.0.

15. The method of claim 1 wherein in the process for preparing the catalyst, the alkali metal silicate is admixed with an aqueous medium containing said dissolved substances in amounts to provide between about $1 \times 10^{-3}$ and $6 \times 10^{-3}$ mole per liter each of calcium ion and magnesium ion.

16. The method of claim 1 wherein in the process for preparing the catalyst, the alkali metal silicate is admixed with an aqueous medium containing said dissolved substances in amounts to provide between about $2.5 \times 10^{-3}$ and $3.0 \times 10^{-3}$ mole per liter each of calcium ion and magnesium ion.

17. The method of claim 1 wherein in the process for preparing the catalyst, about 0.2–0.5 mole per liter of the alkali metal silicate is admixed with the aqueous medium.

18. The method of claim 1 wherein in the process for preparing the catalyst, the alkali metal silicate has an alkali metal oxide to silicon dioxide ratio between about 0.9:1.0 and 1.2:1.0.

19. The method of claim 1 wherein in the process for preparing the catalyst, the alkali metal silicate is alkali metal metasilicate having an alkali metal oxide to silicon dioxide ratio of about 1.0:1.0.

20. The method of claim 1 wherein in the process for preparing the catalyst, about 0.01–0.1 mole per liter of the surfactant is admixed with the aqueous medium.

21. The method of claim 1 wherein in the process for preparing the catalyst, the surfactant comprises sulfated castor oil.

22. The method of claim 1 wherein in the process for preparing the catalyst, the alkali metal silicate is admixed with an aqueous medium containing said dissolved substances in amounts to provide between about $1 \times 10^{-3}$ and $6 \times 10^{-3}$ mole per liter each of calcium ion and magnesium ion, the ratio of calcium ion to magnesium ion is between about 1.5:1.0 and 1.0:1.5, about 0.2:0.5 mole per liter of the alkali metal silicate is admixed with the aqueous medium, and the alkali metal silicate has an alkali metal oxide to silicon dioxide ratio between about 0.9:1.0 and 1.2:1.0.

23. The method of claim 1 wherein in the process of preparing the catalyst, the alkali metal silicate is admixed with an aqueous medium containing said dissolved substances in amounts to provide between about $2.5 \times 10^{-3}$ and $3.0 \times 10^{-3}$ mole per liter each of calcium ion and magnesium ion, the aqueous medium contains about equimolar amounts of calcium ion and magnesium ion, about 0.2–0.3 mole per liter of the alkali metal silicate is admixed with the aqueous medium, and the alkali metal silicate is alkali metal metasilicate having an alkali metal oxide to silicon dioxide ratio of about 1.0:1.0.

24. The method of claim 23 wherein in the process for preparing the catalyst, the alkali metal metasilicate is sodium metasilicate having a sodium oxide to silicon dioxide ratio of about 1.0:1.0.

25. The method of claim 23 wherein in the process for preparing the catalyst, about 0.01–0.1 mole per liter of the surfactant is admixed with the aqueous medium.

26. The method of claim 25 wherein in the process for preparing the catalyst, the surfactant comprises sulfated castor oil.

27. The method of claim 26 wherein in the process for preparing the catalyst, the alkali metal metasilicate is sodium metasilicate having a sodium oxide to silicon dioxide ratio of about 1.0:1.0.

28. The method of claim 27 wherein in the process for preparing the catalyst, at least 50% of the hydroxy groups of the castor oil are sulfated, and about 0.03–0.07 mole per liter of the sulfated castor oil is admixed with the aqueous medium.

\* \* \* \* \*